United States Patent
DePiazza

(10) Patent No.: US 6,848,553 B2
(45) Date of Patent: Feb. 1, 2005

(54) COLLAPSING CLUTCH RETAINER

(75) Inventor: David R. DePiazza, Aberden, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/150,188

(22) Filed: May 17, 2002

(65) Prior Publication Data

US 2003/0213670 A1 Nov. 20, 2003

(51) Int. Cl.$^7$ ................................................ F16D 11/04
(52) U.S. Cl. ....................... 192/52.5; 192/93 R; 192/98
(58) Field of Search ...................... 192/98, 52.5, 70.21, 192/70.23, 70.24, 54.5, 89.21, 93 R, 93 C

(56) References Cited

U.S. PATENT DOCUMENTS

| 2,055,258 | A | * | 9/1936 | McNeil | ........................ | 74/110 |
| 2,253,284 | A | * | 8/1941 | Lucien | ........................ | 192/70 |
| 5,667,048 | A | * | 9/1997 | Maucher | ................... | 192/70.25 |
| 5,669,480 | A | * | 9/1997 | Kooy et al. | ............... | 192/89.21 |

* cited by examiner

Primary Examiner—Saul Rodriguez
(74) Attorney, Agent, or Firm—Cohen, Pontani, Lieberman & Pavane

(57) ABSTRACT

A clutch assembly for a motor vehicle includes a retainer assembly having an upper and lower portion separable by a separating member. The separable member causes the retainer assembly to contract in response to movement toward a released position. Contracting the retainer assembly in the release position provides for additional clearance between the friction discs and flywheel without a corresponding increase in the length of travel of the retainer assembly. The guide member is stationary relative to the retainer assembly and cooperates with the separating member to cause the retainer assembly to expand and contract during movement to engage and disengage the clutch. Additional movement of the retainer assembly increases clearance to between the flywheel and friction discs without corresponding increase in retainer assembly travel to minimize clutch drag.

10 Claims, 4 Drawing Sheets

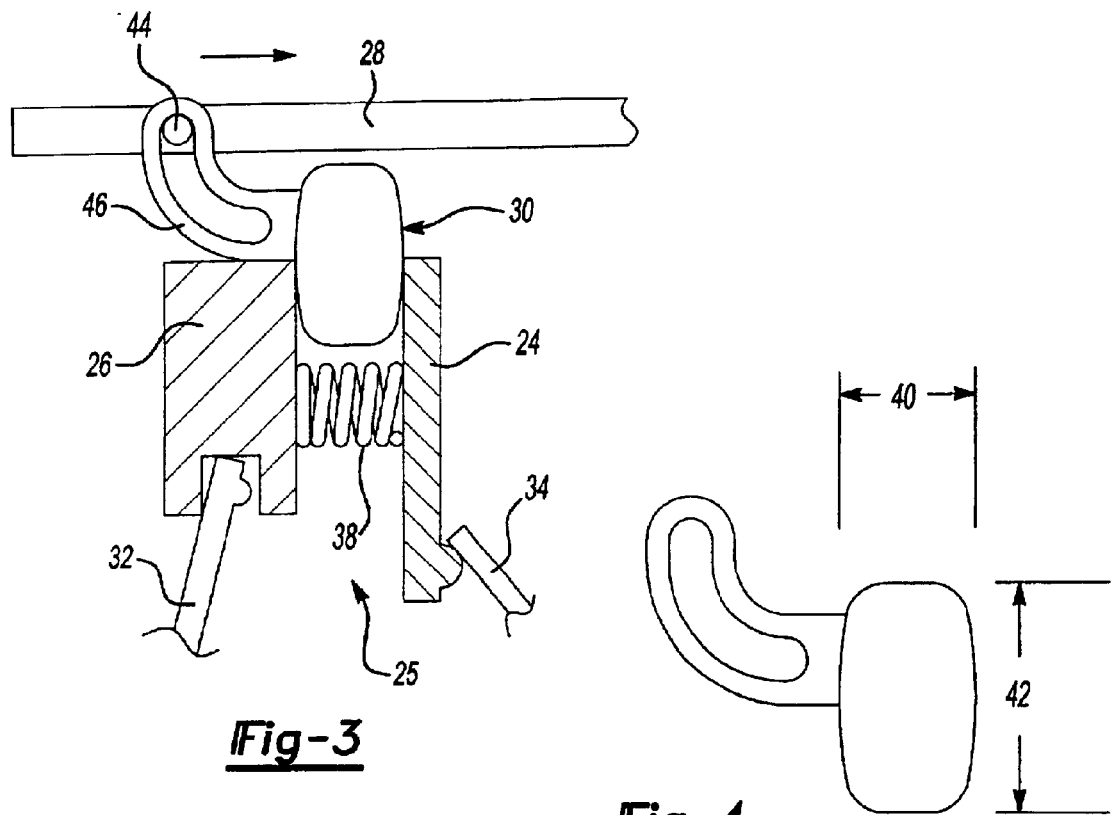
Fig-3
Fig-4
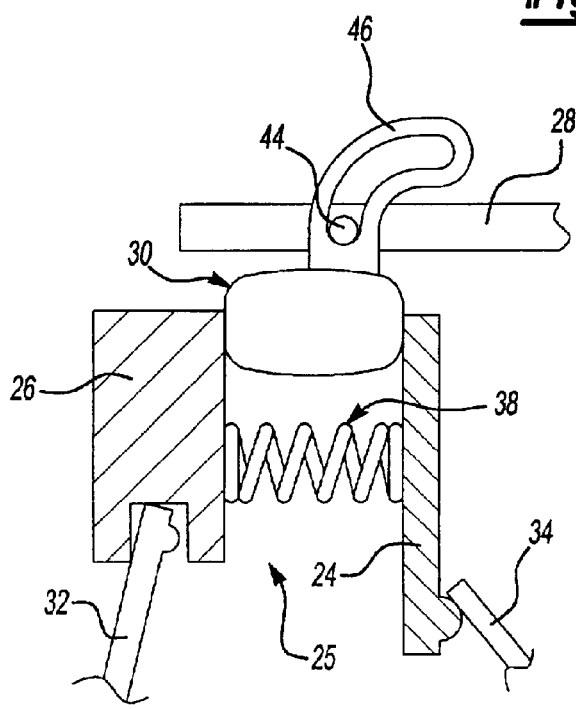
Fig-5

COLLAPSING CLUTCH RETAINER

BACKGROUND OF THE INVENTION

The present invention relates generally to a clutch retainer for a motor vehicle clutch assembly, and specifically to a retainer assembly that expands to maximize pressure plate travel.

Typically, a clutch is utilized to selectively transmit torque between an engine and a transmission. When the clutch is engaged, clutch levers force pressure plates against clutch disks to engage a flywheel. When the clutch is disengaged, the clutch levers are lifted from the pressure plate to disengage the pressure plates and free the clutch discs from engagement with the flywheel.

The clutch levers are moved between an engaged and disengaged position by a retainer assembly moved axially along a shaft. The retainer assembly and the clutch levers are biased toward the engaged position by a diaphragm spring. The clutch disks disengage the flywheels when a force is exerted to pull the retainer assembly toward the disengaged position. Clutch straps bias the pressure plates away from the flywheel so that when the retainer assembly is pulled toward the disengaged position the pressure plates disengage the clutch disks.

The biasing force of the diaphragm spring creates a clamp load against the flywheel. The clamp load determines the amount of torque transfer from the engine to the transmission. The engaged and disengaged positions are obtained by moving the retainer assembly along an axis to transmit a biasing force through a plurality of levers to sandwich the clutch disk between the flywheel and the pressure plate. The biasing force exerted on the pressure plates by the levers is commonly referred to as clamp load. Higher clamp loads provide better torque transfer between the engine and the transmission.

The clamp load is balanced against the amount of force required to disengage the clutch, commonly referred to as pedal effort. Typically, the clamp load is balanced against an increase in pedal effort. Further, if the pressure plates are not moved far enough away from the flywheel, the pressure plates may not completely disengage the clutch. Such a condition can cause increased wear on the friction disks. As appreciated, pulling the pressure plate further away from the flywheel require greater release assembly travel.

Accordingly, there is a need for a clutch assembly with increased clearance between the flywheel and friction disks during disengagement without a corresponding increases in release assembly travel.

SUMMARY OF THE INVENTION

An embodiment disclosed in this application is a clutch assembly including a collapsible retainer assembly for increasing clamp pressure plate travel without increasing retainer assembly travel.

This invention includes a clutch assembly movable between an engaged and disengaged position. This invention provides greater lift off the flywheel by selectively expanding and contracting the retainer arm.

One embodiment of the retainer assembly includes upper and lower retainer portions with a cam positioned therebetween. The cam includes an arm with a slot associated with a guide member. The guide member is stationary relative to the upper and lower retainer portions. The lower retainer portion actuates levers that force the pressure plates to sandwich the clutch disks therebetween. The upper retainer portion is biased toward the engaged position by the diaphragm spring. A guide member remains stationary relative to the upper and lower retainer portions. A spring biases the upper and lower retainer portions towards the collapsed position. The arm includes a slot supported by a pin positioned on the guide member.

The cam includes a length and a width, with the length greater than the width. In the collapsed position of the retainer assembly, the width of the cam is arranged substantially perpendicular to both the upper and lower retainer portions. The spring along with the lever and diaphragm spring bias the upper and lower retainer assemblies towards each other into the collapsed position.

The diaphragm spring drives the retainer assembly toward the engaged position causing rotation of the cam about the pin. Rotation of the cam places the length in a position between and perpendicular to the upper and lower retainer portions. This provides the expanded position of the retainer assembly. Contraction of the retainer assembly in the release position provides additional travel distance. The additional distance provided by the contracted retainer assembly increases clearance between the friction discs and flywheel without increasing the travel length of the retainer assembly along the axis Another embodiment of the retainer assembly includes upper and lower retainer portions that cooperate to form a cavity. At least two balls are disposed within the cavity and cooperate with a guide member. The guide member includes a ramped portion extending between a first diameter and a second diameter. The first diameter is larger than the second diameter such that movement of the upper and lower retainer assemblies, relative to the guide member changes the configuration of the cavity.

In the collapsed position, the upper retainer portion is pulled up against a shoulder. In this position, the smaller diameter cooperates with the cavity, trapping the balls in a position allowing the upper and lower portions, to collapse onto each other. Biasing springs within the lower retainer portion bias the balls against the guide member. The lever biases the lower retainer portion towards the upper retainer and the diaphragm spring biases the upper retainer portion toward the lower retainer portion. The upper retainer portion includes slots for receiving the springs in the collapsed position.

Release of the clutch pedal moves the upper retainer portion toward the engaged position. As the upper retainer portion moves relative to the stationary guide member, the balls are driven along the ramped portion from the smaller diameter towards the larger diameter. Cooperation between the larger diameter and the cavity changes the configuration of the cavity to trap the balls between the upper and lower retainer portions. A slot receives the guide member in the collapsed position. This configuration of the cavity causes the balls to separate the upper and lower retainer portions, thereby attaining the expanded position of the retainer assembly.

Embodiments of this invention provide for an increased clearance between friction disks and flywheel without increasing the travel distance of the retainer assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a cross-sectional view of one embodiment of the retainer assembly in a collapsed position;

FIG. 4 is a cross-sectional view of the cam;

FIG. 5 is a cross-sectional view of the retainer assembly in an expanded position;

DETAILED DESCRIPTION OF THE PREFERRED EMBODIMENT

Figure 1:
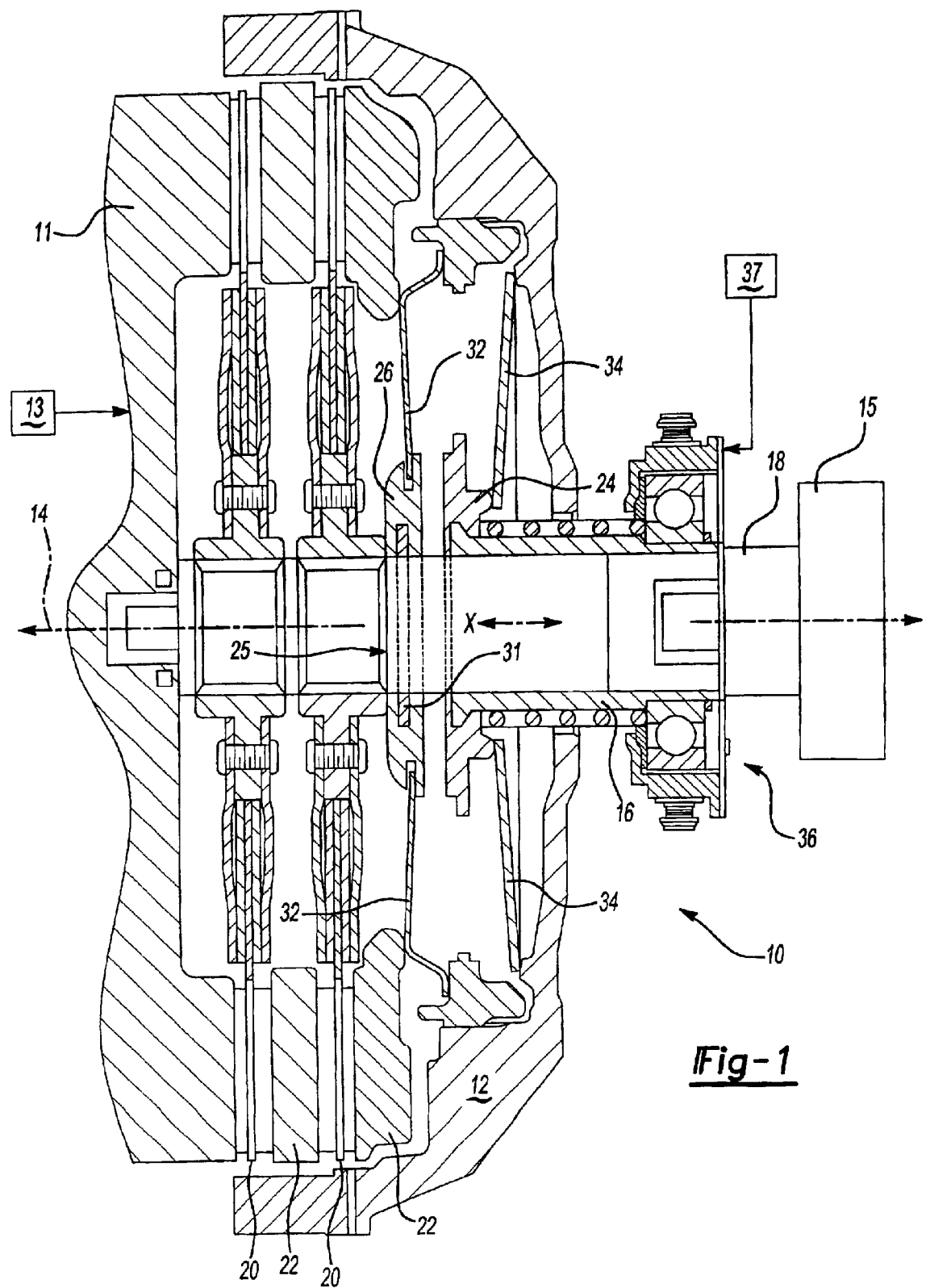
FIG. 1 is a cross-sectional view of the clutch assembly in an engaged position.

FIG. 1 is a cross-sectional view of a clutch assembly 10 including a clutch housing 12 attached to a flywheel 11 to rotate about an axis 14. Clutch disks 20 are sandwiched between pressure plates 22 and the flywheel 11 to transmit torque from engine 13 to a transmission 15. Levers 32 bias the pressure plates 22 into contact with the clutch disks 20, which in turn engage the flywheel 11. The levers 32 are supported between the clutch housing 12 and the retainer assembly 25. The retainer assembly 25 is biased toward the flywheel 11 by a diaphragm springs 34. Clutch straps (not shown) bias the pressure plates 22 away from the flywheel 11. The diaphragm spring 34 overcomes the biasing force of the clutch straps to move the retainer assembly 25 toward the flywheel to an engaged position.

The retainer assembly 25 is movable along the axis 14 between the engaged position and a disengaged position. In the disengaged position, shown in FIG. 2, the retainer assembly 25 releases the levers 32, and the pressure plates 22 from engagement with the clutch disks 20 and the flywheel 11. The retainer assembly 25 includes upper and lower portions 24, 26 movable between an expanded and a collapsed position. A separating member 31 is disposed between the upper and lower retainer portions 24, 26. The separating member 31 moves the upper and lower retainer portions 24, 26 to an expanded position as the retainer as assembly 25 moves toward the engaged position.

A release sleeve 16 connected to a bearing assembly 36 is actuated to move the retainer assembly 25 between engaged and disengaged positions. As appreciated, a worker knowledgeable in the art will understand the operation of the release sleeve 16 and the bearing assembly 36 to selectively couple the engine 13 and the transmission 15 (both shown schematically).

Figure 2:
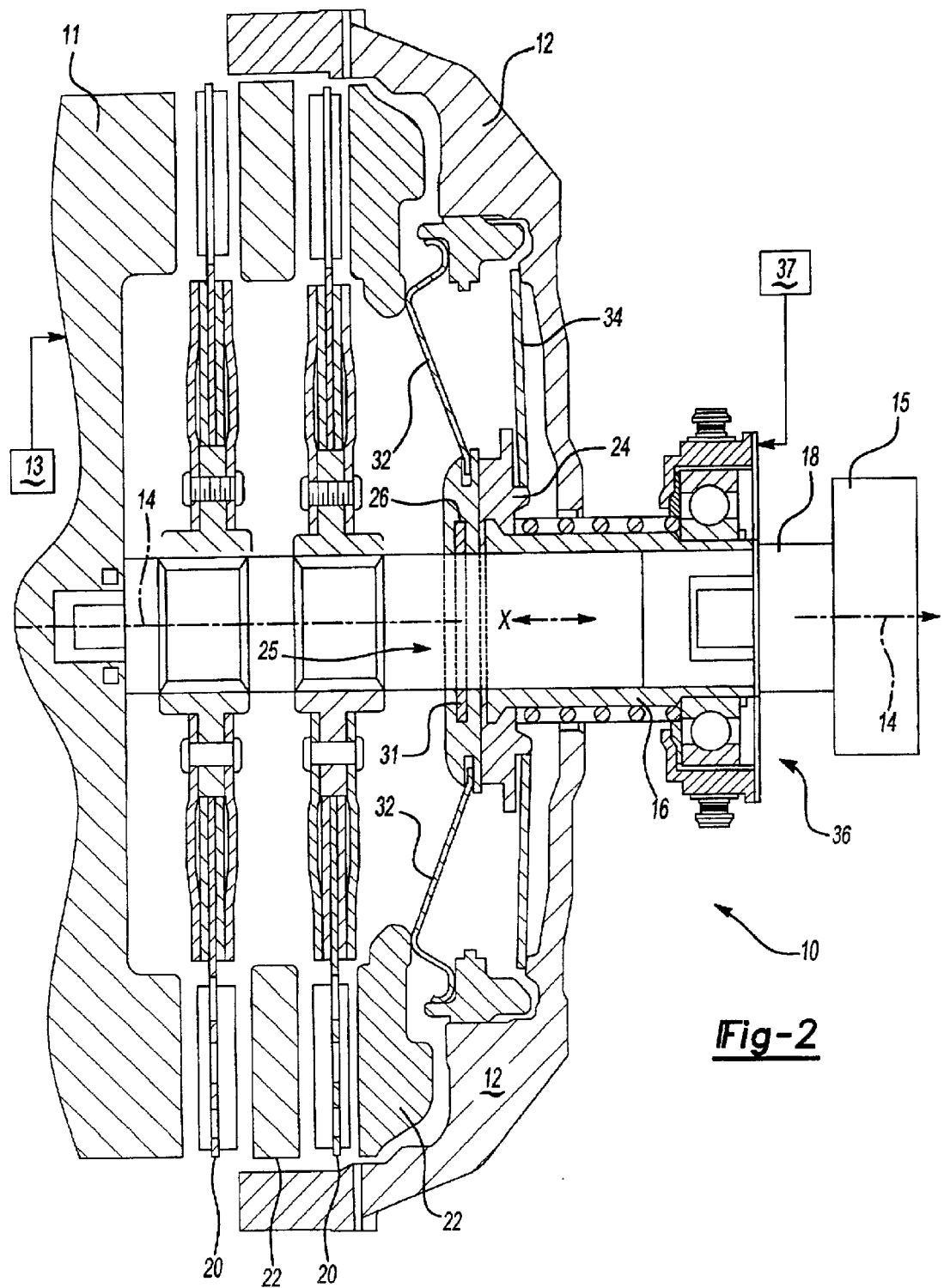
FIG. 2 is a cross-sectional view of the clutch assembly in a disengaged position.

Referring to FIG. 2, the clutch assembly 10 is shown in a disengaged position. In the disengaged position the bearing assembly 36 is pulled away from the flywheel 11, thereby pulling the release sleeve 16 and the retainer assembly 25 toward the disengaged position. The separating member 31 shifts between the upper and lower retainer portions 24, 26 to provide a collapsed position of the retainer assembly 25.

The biasing load exerted by the diaphragm spring 34 is overcome by depressing a clutch pedal 37. It is desirable to have relatively high clamp loads during engagement of the clutch disks 20 with the flywheel 11. The retainer assembly 25 of this invention contracts to provide greater clearance between pressure plate 22 and flywheel 11 without increasing retainer assembly 25 travel to eliminate the need for additional pedal travel.

Referring to FIGS. 3–5, an embodiment of the retainer assembly 25 is disclosed and includes the upper and lower retainer portions 24, 26 separated by a cam 30. The lower retainer portion 26 is connected to actuate the lever 32. The upper retainer portion 24 is biased toward an engaged position by the diaphragm spring 34. The retainer assembly 25 illustrated in FIG. 3 is in the collapsed position. Movement toward the disengaged position of the clutch assembly 11 coincides with the collapse of the retainer assembly 25.

A guide member 28 remains stationary relative to the upper and lower retainer portions 24, 26. A spring 38 biases the upper and lower retainer portions 24, 26 towards each other and the collapsed position. The cam 30 includes an arm 45 with a slot 46 engaged to pin 44. The pin 44 is positioned on the guide member 28.

The cam 30 includes a length 42 and a width 40 (FIG. 4). The length 42 is greater than the width 40. In the collapsed position of the retainer assembly (FIG. 3), the width 40 is arranged substantially perpendicular to both the upper and lower retainer assemblies 24, 26. The spring 38 along with the lever 32 and diaphragm spring 34 biases the upper and lower retainer portions 24,26 towards each other into the collapsed position.

When the clutch pedal 37 is released (FIGS. 1 and 2), the diaphragm spring 34 will act to bias the retainer assembly 25 towards the flywheel 11. The guide member 28 remains stationary relative to the retainer assemblies 24, 26. Preferably, the guide member 28 is associated with the retainer assembly 25 for preventing relative rotation between the retainer assembly 25 and the clutch housing 12. A worker skilled in the art would understand that the specific configuration and placement of the guide member 28 is application specific and any type known in the art is within the contemplation of this invention.

The diaphragm spring 34 drives the retainer assembly 25 toward the engaged position causing rotation of the cam 30 about the pin 44. Rotation of the cam 30 places the length 42 in a position between and perpendicular to the upper and lower retainer portions 24,26 (FIG. 5). This provides the expanded position of the retainer assembly 25. Expansion of the retainer assembly provides additional travel distance along the axis 14, forcing the levers 32 into contact with the pressure plates 22. The additional distance provided by the cam 30 increases the clamp load on the flywheel 11 without increasing the travel length of the retainer assembly 25 along the axis 14. Subsequent actuation of the clutch pedal 37 pulls the upper retainer assembly 24 upwardly, causing the cam 30 to rotate about the pivot pin 44 to the collapsed position shown in FIG. 3.

Figure 6:
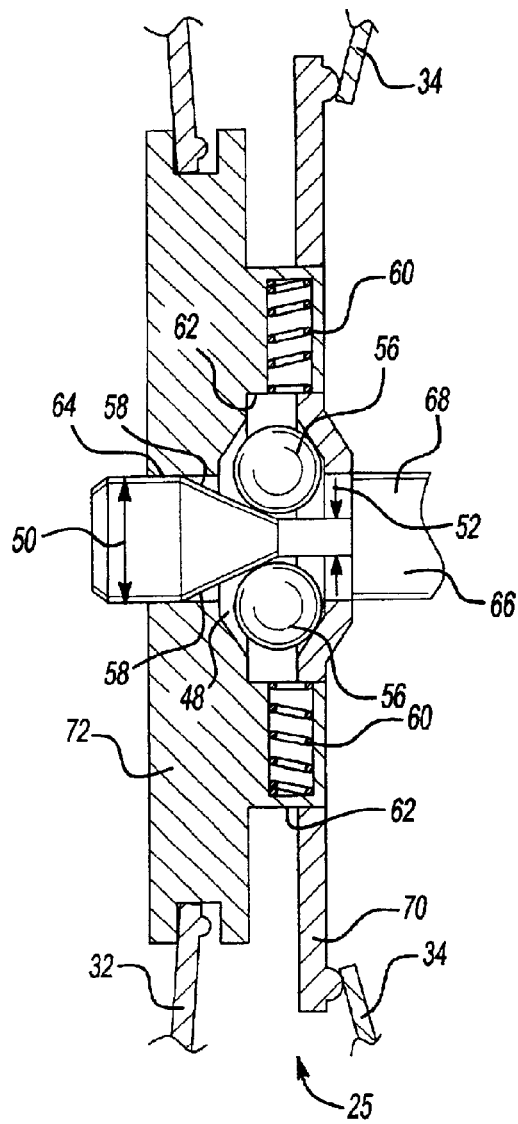
FIG. 6 is a cross-sectional view of another embodiment of the retainer assembly in the collapsed position.
Figure 7:
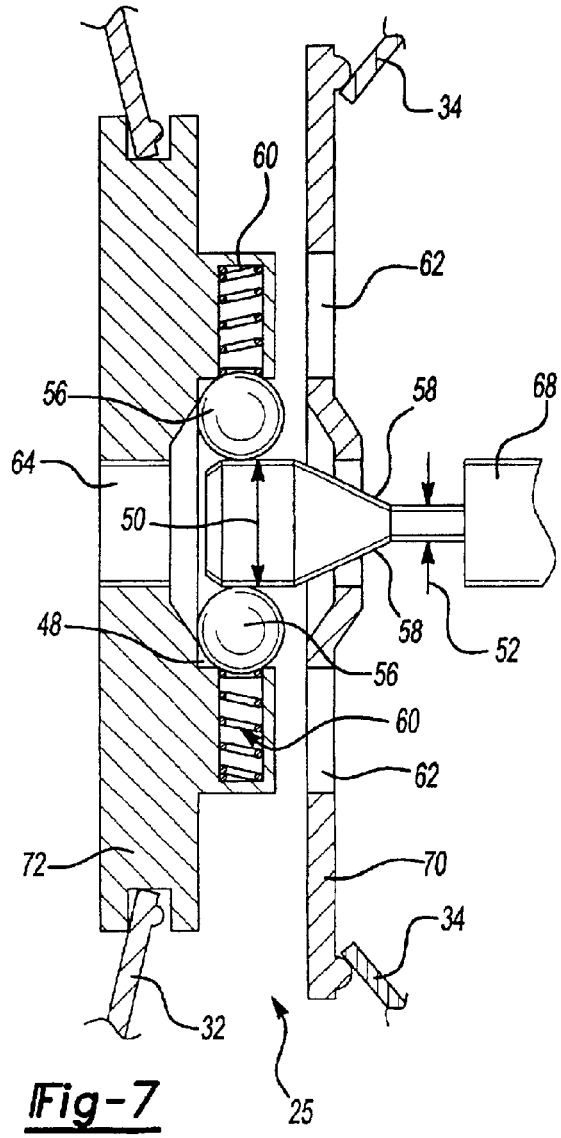
FIG. 7 is an embodiment of the retainer assembly in an expanded position.

Referring to FIGS. 6 and 7, another embodiment of the retainer assembly 25 is disclosed. In this embodiment, upper and lower retainer portions 70, 72 cooperate to form a cavity 48. At least two spherical members 56 are disposed within the cavity 48 and cooperate with the guide member 68. The guide member 68 includes a ramped portion 58 extending between a first diameter 50 and a second diameter 52. The first diameter 50 is larger than the second diameter 52 such that movement of the upper and lower retainer assemblies 70,72 relative to the guide member 68 changes the configuration of the cavity 48.

In the collapsed position (FIG. 6) the upper retainer portion 70 is pulled up against a shoulder 66. In this position, the smaller diameter 52 cooperates with the cavity 48, trapping the spherical members 56 in a position allowing the upper and lower portions 70, 72 to collapse onto each other. Biasing springs 60 bias the spherical members 56 against the guide member 28. The lever 32 biases the lower retainer portion 72 towards the upper retainer 70 and the diaphragm spring 34 biases the upper retainer portion 70 toward the lower retainer portion 72. The upper retainer portion includes slots 62 for receiving the springs 60 in the collapse position.

Release of the clutch pedal 37 moves the upper retainer portion 70 toward the engaged position. As the upper retainer portion 70 moves relative to the stationary guide member 68, the spherical members 56 are driven along the ramped portion 58 from the smaller diameter 52 towards the larger diameter 50. Cooperation between the larger diameter 50 and the cavity 48 changes the configuration of the cavity to trap the spherical member 56 between the upper and lower retainer portions 70, 72. A slot 64 receives the guide member 68 when the retainer assembly 25 is in the collapsed position. This configuration of the cavity 48 separates the upper and lower retainer portions 70, 72, thereby attaining the expanded position of the retainer assembly 25. Expansion of the retainer assembly 25 increases the travel of the levers 32, resulting in an increase in clamp load exerted on the pressure plates 20. Further, contraction of the retainer assembly 24 results in greater clearance between the flywheel 11 and pressure plates 22 without a corresponding increase in retainer assembly 24 travel.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A clutch assembly comprising:
   a retainer assembly movable along an axis of rotation and including an upper retainer portion and a lower retainer portion movable axially relative to each other;
   a separating member disposed between said upper and lower retainer portions for selectively moving said upper and lower retainer portions between expanded and collapsed positions;
   a guide member stationary relative to said upper and lower retainer portions and connected to said separating member;
   wherein said guide member comprises a ramped portion cooperating with said separating member; and
   wherein said separating member comprises at least one spherical member.

2. The assembly of claim 1, further including a biasing member biasing said upper and lower retainer portions toward said collapsed position.

3. The assembly of claim 1, wherein the upper and lower retainer portions form a cavity therebetween to guide aid at least one spherical member against said ramped portion of said guide member.

4. The assembly of claim 3, further including at least one biasing member to bias said at least one spherical member against said ramped portion.

5. The assembly of claim 4, wherein said ramped portion extends from a first width to a second width smaller than said first width, said upper and lower retainer portions move axially relative to said guide member and said first and second widths are selectively associated with said cavity to provide said expanded and collapsed positions.

6. The assembly of claim 5, wherein said first width cooperates with said cavity in said expanded position.

7. The assembly of claim 6, wherein said second width cooperates with said cavity in said collapsed position.

8. A clutch assembly comprising:
   a retainer assembly movable along an axis of rotation an including upper and lower retainer portions forming a cavity therebetween, said upper and lower retainer portions movable axially relative to each other;
   a lever movable between an engaged and disengaged position and supported by a clutch housing assembly and said lower retainer;
   a diaphragm spring connected to said upper retainer to bias said retainer assembly toward said engaged position;
   a guide member stationary relative to said axial movement of said retainer assembly; and
   at least one spherical member disposed within said cavity and cooperating with said guide member for selectively moving said upper and lower retainer portions between expanded and collapsed positions.

9. The assembly of claim 8, wherein said guide member includes a first diameter, and a second diameter larger than said first diameter and a ramped transition between said first and second diameters.

10. The assembly of claim 9, wherein said spherical member guides along said ramped transition between said first and second diameters within said cavity, said spherical members forced between said upper and lower retainer portions to expand said retainer assembly.

* * * * *